(12) United States Patent  
Weber et al.

(10) Patent No.: US 12,352,554 B2  
(45) Date of Patent: Jul. 8, 2025

(54) OPERATION OF A COORDINATE MEASURING MACHINE WITH A PERSON-GUIDED SENSOR

(71) Applicant: Carl Zeiss Industrielle Messtechnik GmbH, Oberkochen (DE)

(72) Inventors: Benjamin Weber, Oberkochen (DE); Dominik Seitz, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 18/744,628

(22) Filed: Jun. 15, 2024

(65) Prior Publication Data

US 2024/0418500 A1     Dec. 19, 2024

(30) Foreign Application Priority Data

Jun. 15, 2023   (DE) .................... 10 2023 205 636.4

(51) Int. Cl.
*G01B 11/00*   (2006.01)
*G01B 21/04*   (2006.01)

(52) U.S. Cl.
CPC .......... *G01B 11/005* (2013.01); *G01B 21/047* (2013.01)

(58) Field of Classification Search
CPC ........................... G01B 11/005; G01B 21/047
(Continued)

(56) References Cited

U.S. PATENT DOCUMENTS 5,154,002 A * 10/1992 Ulbrich .................. G01B 7/012  
                                                              33/561  
6,158,136 A    12/2000 Götz et al.  
(Continued)

FOREIGN PATENT DOCUMENTS

DE          19809690 A1    9/1999  
DE      102008011534 A1    9/2009  
(Continued)

OTHER PUBLICATIONS

Office Action issued in German Patent Application No. DE 10 2023 205 636.4 (from which this application claims priority), dated Sep. 19, 2023 and English language machine translation thereof.
(Continued)

*Primary Examiner* — George B Bennett  
(74) *Attorney, Agent, or Firm* — Ewers IP Law PLLC; Falk Ewers

(57) ABSTRACT

A method for operating an optical sensor, which has a movement controller that can be actuated by a user to control a movement of the sensor relative to a measurement object, includes identifying that the sensor is in a favorable state of movement relative to the measurement object, and generating and outputting a signal when the sensor is in the favorable state of movement to assist the user in keeping the sensor in the favorable state of movement, and/or inhibiting or blocking by machine a movement of the sensor which would cause the sensor to leave the favorable state of movement. To achieve a favorable orientation of the sensor, generating and outputting a third signal signals to the user to actuate the movement controller such that the sensor achieves the favorable orientation, and/or controlling by machine a movement of the sensor which causes the sensor to achieve the favorable orientation.

15 Claims, 6 Drawing Sheets

(58) Field of Classification Search
USPC .................................................. 33/502, 503
See application file for complete search history.

(56) References Cited

U.S. PATENT DOCUMENTS

| | | | |
|---|---|---|---|
| 7,064,845 B2 | 6/2006 | Christoph | |
| 7,358,516 B2* | 4/2008 | Holler | G01S 17/06 |
| | | | 356/493 |
| 8,736,846 B2* | 5/2014 | Gurny | G01B 11/026 |
| | | | 356/497 |
| 9,671,257 B2* | 6/2017 | Held | G01B 7/004 |
| 9,803,966 B2* | 10/2017 | Pettersson | G01B 5/008 |
| 10,281,579 B2* | 5/2019 | Kern | G01B 21/042 |
| 10,429,183 B2* | 10/2019 | Johnson | G02B 26/10 |
| 11,504,197 B1* | 11/2022 | Noonan | A61B 34/70 |
| 11,524,407 B2* | 12/2022 | Otsuki | B25J 9/10 |
| 11,609,089 B2* | 3/2023 | Rüger | G01B 21/20 |
| 12,178,418 B2* | 12/2024 | Wu | A61B 34/76 |
| 2004/0264758 A1 | 12/2004 | Christoph | |
| 2020/0363187 A1* | 11/2020 | Haverkamp | G01B 11/005 |
| 2021/0372769 A1* | 12/2021 | Eiles | G01B 11/005 |
| 2022/0319027 A1* | 10/2022 | Aidukas | G06T 7/55 |
| 2024/0029216 A1* | 1/2024 | Schmidt | G06T 7/80 |

FOREIGN PATENT DOCUMENTS

| | | |
|---|---|---|
| DE | 102008020250 A1 | 10/2009 |
| DE | 102014220540 A1 | 4/2015 |
| DE | 102020200155 A1 | 7/2021 |
| DE | 102018206181 B4 | 12/2021 |
| EP | 1319164 B2 | 1/2014 |

OTHER PUBLICATIONS

Office Action issued in German Patent Application No. DE 10 2023 205 636.4 (from which this application claims priority), dated Feb. 2, 2024 and English language machine translation thereof.

* cited by examiner

OPERATION OF A COORDINATE MEASURING MACHINE WITH A PERSON-GUIDED SENSOR

CROSS REFERENCE TO RELATED APPLICATIONS

This application claims priority to German patent application DE 10 2023 205 636.4, filed Jun. 15, 2023, the entire content of which is incorporated herein by reference.

TECHNICAL FIELD

The disclosure relates to a method for operating a coordinate measuring machine with a person-guided sensor and motor assistance, and further relates to such a coordinate measuring machine. The motor assistance assists the user with the movement of the sensor. Furthermore, the coordinate measuring machine has a movement controller which can be actuated by a user (i.e., a person) in order to control a movement of the sensor relative to a measurement object. The movement of the sensor may be a movement relative to a fixed base of the sensor. However, it is also possible for the movement to be a relative movement of the sensor with respect to the measurement object and for the relative movement to at least partly also take place by movement of the measurement object.

BACKGROUND

The term coordinate measuring machine includes any types of machines that can be used to determine coordinates of workpieces. In a particular class of coordinate measuring machines, the coordinates are surface coordinates, i.e., coordinates of surface points of workpieces are determined. The term coordinate measuring machine includes in particular conventional coordinate measuring machines, for example machines with a portal configuration or gantry configuration, and coordinate measuring machines with a movable bridge, on which in particular a quill with a sensor that can be moved relative to the bridge is mounted, horizontal arm machines, articulated arm machines and machines with a hexapod mechanism. It is also not necessary for the sensor to be fastened to a mechanically rigid structure, even though this is typical. Rather, cameras, in particular, that are used for purposes other than measuring coordinates are also used on mechanisms such as cable constructions. For example, so-called spidercams are known from the camera-based transmission of sporting events. For example, camera-based positioning systems can be used to identify the position and orientation of the camera and thus achieve the functionality of a coordinate measuring machine. For example, at least two observation cameras capture the position and orientation of the main camera, which captures the measurement object, from different viewing directions. The term coordinate measuring machine also covers machines, which, although not primarily configured as coordinate measuring machines, are set up to work like a coordinate measuring machine. In particular, these machines have at least one measuring sensor which is used to determine the coordinates. Machines whose mechanism is configured, for example, in the form of articulated arm robots and which, instead of a tool or in addition to a tool, have a sensor for capturing the workpiece surface (for example a strip projection sensor), or machine tools, to which a measuring sensor is fastened instead of a machining tool or in addition to a machining tool, are known for example. Also known for example are hexapod mechanisms, to which a sensor for capturing the workpiece surface (for example a tactile sensor) is fastened instead of a machining tool. However, the aforementioned types of mechanism can be realized not only in machine tools and robots, but also in coordinate measuring machines which exclusively or primarily serve the purpose of determining coordinates of a measurement object. If this description refers to a measurement object, this includes a workpiece or an arrangement of workpieces.

Coordinate measuring machines with a person-guided sensor (i.e., control of movements of the sensor by a user) and motor assistance form a subclass of coordinate measuring machines. They make it possible for a user, through direct mechanical contact of at least one body part (optionally via a transfer object such as a glove) of the user with the sensor and/or with a mechanism of the coordinate measuring machine and/or with at least one separate control means (such as a joystick), to bring the respective sensor into a position and/or orientation in which the sensor can capture a measurement object for the purpose of determining coordinates of the measurement object and/or can contribute to this. One advantage of machines of this subclass is that it is very easy to start up the machines. A measurement object is understood in this description and in the claims to mean any measurement object, which in particular includes a single workpiece and an arrangement of workpieces. A motor is understood as meaning any power machine that performs mechanical work or at least produces a mechanical force by using a form of energy other than mechanical energy to produce the work or force. In particular, electrical energy is converted into mechanical work/force in motors.

The mechanical contact of the at least one body part of the user, in many cases one hand or both hands, with the coordinate measuring machine can take place directly (or via a contact means such as a glove) with the sensor to be positioned and/or with a machine part that is firmly or movably connected to the sensor. An example of a machine part is a handle and/or projection. In the case of a machine part, this is typically movable together with the sensor, but typically immovable relative to the sensor, and the movement of the sensor can be clearly controlled by person-guided movement of the machine part. In this case, the user at least contributes to the movement by producing a mechanical force while performing mechanical work. However, configurations whose motor system completely performs the mechanical work performed during the movement of the sensor, or completely performs the mechanical work at least for certain movements, are also possible. This in turn does not rule out, and in many cases, it is typical, that the person exerts a mechanical force on the sensor and/or the machine part in order to control the movement. If there is at least one separate control means, the user does not perform any mechanical work on the mechanism of the coordinate measuring machine during control. However, mechanical work can be performed on the control means.

In other words, a controller of the motor system, to which the at least one motor and a motor controller belong, of the coordinate measuring machine can obtain the information required to carry out control, for example, from a mechanical force exerted by the user and/or mechanical work performed by the user on the coordinate measuring machine. The one or more motors can also be referred to as a drive. The motor controller can also be referred to as a drive controller.

The motor assistance can therefore involve reducing the amount of mechanical work or mechanical power to be expended by the user, even to the amount of zero, depending on the type of assistance. However, the degree of reduction may vary over time with some types of coordinate measuring machines. If at least one separate control means is used, a mechanical force, power and/or work exerted on the control means may vary over time. For example, a greater mechanical force may be required by the user to generate a movement of the sensor from rest and/or to change a movement speed of the sensor than the force to maintain a movement of the sensor that has already started and is defined by a vector of the movement speed. For example, the motor system can completely generate the mechanical work required for maintaining the movement that has already started, the user typically having the possibility of slowing down or stopping the movement (in particular with motor assistance), for example by applying a force which has a direction opposite to the direction of movement. As an alternative or in addition, the user typically has the possibility of changing the direction of movement and optionally also the absolute value of the speed of movement by applying a force which has a direction running transversely to the direction of movement. Further, as an alternative or in addition, the user typically has the possibility of accelerating the movement. In the case of at least one separate control means, a direction of interaction of the user with the control means can correspond to a direction of movement of the sensor and the same as described in the immediately preceding three sentences can therefore apply.

The disclosure relates to such motor-assisted coordinate measuring machines which are guided by a person through mechanical contact. An alternative to this is that, when the user controls the movement, there is no mechanical contact with the sensor or any other part of the mechanism of the coordinate measuring machine (such as the abovementioned machine part) and there is also no mechanical contact with a separate control means, but rather the user controls the movement using gestures, such as hand gestures or eye movement gestures. Such gesture control processes are known in the field of controlling the movement of machines and are not described in more detail here.

Even if the inventors did not know, as the starting point of the disclosure, that such person-guided coordinate measuring machines have already been provided, it is also possible for a person-guided coordinate measuring machine to control a movement of the sensor using the motor system in certain operating situations, without also taking into account an instruction from the user regarding this movement that is performed. Such movements are referred to below under the term "fully automatically controlled movement".

An aspect of the disclosure is therefore also a person-controlled coordinate measuring machine which performs a fully automatically controlled movement occasionally and/or temporarily and in at least one predefined operating situation.

The present disclosure relates to all the types and variants of coordinate measuring machines described above, with at least one person-guided sensor and motor assistance.

The sensor is an optical sensor. This means in particular that there must be no mechanical contact between the sensor and the measurement object, even if mechanical contact, for example, of an edge of an optical system of the sensor with the measurement object is not completely excluded. Optical sensors capture the measurement object with electromagnetic radiation. Optionally, measurement radiation is radiated onto the measurement object. For example, with camera sensors, however, in many cases the measurement radiation amounts to nothing more than radiation from the surrounding area being incident on the measurement object. In another type of camera sensors, locally structured measurement radiation is radiated on the measurement object, for example a grating structure or another predefined structure. With knowledge of the structure, depth information can then be obtained. Often, camera sensors capture a two-dimensional image of the measurement object within the capture range, in which both dimensions extend perpendicular to the viewing direction of the camera. However, the disclosure also relates to one-dimensional camera sensors such as line-scan cameras. In particular, the camera can therefore have at least one matrix of sensor elements, which is two-dimensional in the case of the two-dimensional image and has, for example, sensor elements arranged in rows and columns, and which has a line of sensor elements in the case of the line-scan camera. Both in the case of the one-dimensional camera image and in the case of the two-dimensional camera image, depth information can be additionally determined, in which case different measurement principles are possible, such as the aforementioned use of locally structured measurement radiation and/or by applying the time of flight (TOF) principle, i.e., the principle of time-of-flight measurement.

If the sensor is an imaging sensor, then the sensor has a non-punctiform capture range for capturing at least part of a measurement object. In contrast to a laser triangulation sensor, for example, a camera sensor is imaging, for example. However, as is often the case with cameras with a sensor matrix, the sensor may not capture the individual pixels of the image exactly at the same time, but, for example, pixel by pixel across each individual image line. Other known methods for pixel-wise recording of the images can also be implemented.

However, the disclosure is not only applicable to imaging optical sensors, but also to sensors with a punctiform capture range. Examples of such sensors are confocal chromatic sensors (for example white light sensors) and laser triangulation sensors. The fact that these are optical sensors with a punctiform capture range nevertheless makes it possible to capture surface regions of the measurement object that are larger than punctiform surface regions by performing a relative movement between the sensor and the measurement object. Punctiform is understood as meaning that a usually very small, almost punctiform capture range is not captured and evaluated further in a locally resolved manner. For imaging sensors, on the other hand, the capture range is divided locally during capture and evaluation.

Coordinate measuring machines with a person-guided sensor allow the user to easily bring the sensor into a desired position. However, it is difficult for the user to set both a suitable distance between the sensor and the measurement object and a suitable orientation of the sensor.

SUMMARY

It is an object of the present disclosure to provide a method for operating an optical sensor on a person-guided, motor-assisted coordinate measuring machine and a corresponding coordinate measuring machine, which make it easier for the user to set a distance between the sensor and the measurement object and an orientation of the sensor. In particular, the settings should be able to be maintained easily even during the measurement of the measurement object.

The present disclosure relates to an optical sensor operated on a person-guided coordinate measuring machine, in particular an optical sensor as described above.

The present disclosure further relates to the types and variants of coordinate measuring machines described above, with at least one person-guided sensor and motor assistance. An additional feature is also added, namely that the person, i.e., the user, can receive haptically perceptible feedback from the motor assistance with regard to the direction in which the sensor should be moved and/or should not be moved. The term direction is not only to refer to at least one linear degree of freedom of the movement, but alternatively or additionally also to at least one rotational degree of freedom of the movement. It can therefore be at least one rectilinear direction and/or at least one direction of rotation.

A method for operating an optical sensor on a person-guided, motor-assisted coordinate measuring machine is also provided. The disclosure is based on the recognition that the suitability and/or quality of the capturing of a surface of a measurement object, in particular a workpiece, depends on the orientation of the optical sensor relative to the workpiece.

By way of example, an imaging camera can capture the surface of a workpiece sharply in a large part of the capture range or in the entire capture range only if the optical axis of the camera is perpendicular to the surface. Of course, the distance between the camera and the workpiece surface must also be set here such that a sharp image is created. For non-imaging sensors such as confocal chromatic sensors and laser triangulation sensors, the orientation of the sensor relative to the surface must be set so as to enable a measurement. For confocal chromatic sensors, the measurement radiation (for example the white light) is usually irradiated perpendicularly or approximately perpendicularly onto the surface, such that the reflected radiation likewise has its intensity maximum perpendicular or approximately perpendicular to the surface. In many cases, laser triangulation sensors require an orientation at a predefined angle to the surface normal in order to be able to receive the reflected radiation according to the laws of reflection. For laser triangulation sensors as well, in the case of a mirroring reflective measurement object, it is also necessary to prevent such mirrored reflected radiation being captured. The specifications for the use of optical sensors therefore contain appropriate information about the required or recommended orientation of the respective sensor when it is used on a coordinate measuring machine, and it is therefore possible to define appropriate criteria in order to identify whether the sensor is suitable, at a given orientation, for capturing a measurement object for the purpose of measuring it, and/or whether the sensor, at the given orientation, captures the surface of the measurement object with a sufficient quality. For non-imaging optical sensors as well, the specifications contain recommendations or requirements regarding the distance between the sensor and the surface of the measurement object. For example, for confocal chromatic sensors, it is recommended for the sensor to be located at a distance from the measurement object that is approximately in the center of the distance measurement range. For a laser triangulation sensor, the orientation relative to the measurement object and the distance from the measurement object must be tailored to one another. If for example the distance is too great, then the sensor is no longer able to capture the reflected radiation at a given angle of incidence relative to the surface normal. For an imaging sensor with an autofocus function, there is a range of relative positions in relation to, or in other words distances from, the surface of the measurement object in which the focus may be set so as to lie on the surface. In this case too, it is typical for the favorable state of movement (see below) to be a relative position or a partial range of relative positions in the center of the entire range of relative positions.

Particularly in the case of imaging sensors, the capture quality may be described by a quality value that can change continuously within an interval of values. This applies for example if the size of the surface region imaged sharply by the sensor is incorporated into the quality value, for example as a proportion of the capture range. It is also possible however to determine, for multiple different partial ranges of the capture range, in each case whether the image of the surface of the measurement object is sharp according to a predefined criterion. It is known in this respect for example that a local profile of the image values is evaluated in the image region of the camera, which corresponds to part of the capture range. At edges and other structures on the surface that deviate from a smooth surface profile, the profile of the image values is erratic when the image is sharp. This may be identified for example based on gradients of the profile.

In particular, it is provided for the user to be assisted by the coordinate measuring machine in terms of keeping the sensor in a favorable state of movement, namely a relative position or a range of relative positions in relation to the measurement object. In the relative position or the relative positions, the sensor can capture at least part of a surface of the measurement object. The favorable state of movement is achieved or exists in particular when a first predefined criterion with regard to a suitability and/or quality of the capturing of the measurement object by the sensor is satisfied. In principle, there are various options for the criterion. By way of example, the criterion may define, based on available information about the sensor, the position in which (or in the case of a range of relative positions, the positions in which) or the distance from which (or in the case of a range of relative positions, the distance range from which) the sensor should be located in relation to the measurement object so that the favorable state of movement is achieved. By way of example, using information about the shape and relative position of the measurement object and using information from the position measuring system of the coordinate measuring machine about the position of the sensor, a controller of the coordinate measuring machine may then determine how the sensor should be moved in order to achieve the favorable state of movement. According to another exemplary embodiment, the sensor itself may be used to identify whether the criterion is satisfied. Signals from the sensor from the capturing of its environment may be evaluated. If the sensor captures in particular the measurement object and in the process the criterion is satisfied, then the favorable state of movement is achieved. For example, in the case of an imaging sensor, at least one image generated by the sensor may be evaluated in order to identify whether at least part of the surface of the measurement object is captured sharply in the image. In all cases, the criterion may also be used to identify whether the sensor has left the favorable state of movement again.

How the suitability or quality of the capturing of the measurement object by the sensor can be expressed depends in particular on the type of sensor. An imaging sensor may for example capture the surface of the measurement object in a suitable manner if the image of the surface generated by way of its sensor signals is sharp at least in subregions, typically in a central region, for example in a region in which an optical axis or a predefined axis (see below) of the sensor pierces the surface of the measurement object. The first criterion may therefore require for example the image to be sharp in this central region. In general, when this criterion is satisfied, the sensor is not looking perpendicularly onto the surface of the measurement object (for example, the optical axis or the predefined axis is not perpendicular to the surface), and the quality of the capturing of the measurement object can be further increased by optimizing the orientation of the sensor. However, if the sensor is an imaging sensor that also generates depth information (for example by evaluating projected pattern information or by recording a focus stack), or is a confocal chromatic sensor (i.e., a distance sensor), then suitability exists in principle when the sensor is located in a relative position in relation to the measurement object in which it is possible to carry out a measurement that involves obtaining depth information. Typically, however, the first criterion not only requires a measurement with depth information to be possible, but requires the sensor to be located in a relative position that corresponds to the center of its range over which it is possible to obtain depth information. For a confocal chromatic sensor, this range is the range in which it is possible to determine a distance from the measurement object. The expression "the center of the range" may denote the exact center (the point of symmetry) of the range, a point near the exact center of the range, or a central range that contains the exact center. The quality of the capturing of the measurement object may correspond, especially for imaging sensors without obtaining depth information, to the sharpness of the image or the size or proportion of the sharply imaged part of the image. For such sensors, it may in particular be necessary to increase the quality of the capturing by setting the favorable orientation. A favorable orientation may therefore be achieved when the quality of the capturing has been increased according to a second predefined criterion or has achieved a quality predefined by the criterion.

In particular, the favorable state of movement is based not only on degrees of freedom of the movement of the optical sensor relative to the measurement object, but optionally also on at least one optical degree of freedom. This is understood as meaning that it is possible to set properties of an optical system of the sensor. In particular, this setting of properties of the optical system makes it possible to change the suitability and/or quality of the capturing of the measurement object by the sensor. In other words, the satisfaction of the first predefined criterion in the presence of an optical degree of freedom may also depend on the state with respect to the optical degree of freedom. If the state with respect to the optical degree of freedom is changed (i.e., the setting of properties of the optical system is changed), the first predefined criterion may be satisfied in one case, i.e., the favorable state of movement is then achieved, or, in another case, no longer be satisfied, i.e., the favorable state of movement is left. In particular, it is possible for the optical degree of freedom to be set completely or partially automatically. Examples will be discussed below. As an alternative or in addition, the state with respect to the optical degree of freedom can be set in a user-guided manner. In this case, at least one signal (for example the first and/or second signal described further below) may be generated and output in a manner perceptible to the user. Further, as an alternative or in addition, when the favorable state of movement has been achieved, a change in the state with respect to the optical degree of freedom can be inhibited or blocked by machine, for example by inhibiting or blocking a relative movement and/or deformation of optical lens elements.

Overall, the method for operating an optical sensor or the coordinate measuring machine may, in a first exemplary embodiment, have at least two mechanical degrees of freedom of the movement, the states of movement of which may be set independently of one another or in a manner coupled to one another, and wherein the setting makes it possible to achieve the favorable state of movement. In a second exemplary embodiment, which can be implemented independently of the first exemplary embodiment, or is a further exemplary embodiment of the first exemplary embodiment, there is at least one optical degree of freedom, the state of which can be set, wherein the setting makes it possible to achieve the favorable state of movement.

For example, in one exemplary embodiment of the method, the favorable state of movement may therefore
- depend on the states of at least one mechanical degree of freedom of the movement of the sensor and on the setting of properties of an optical system of the sensor, and/or
- depend on the states of at least two mechanical degrees of freedom of the movement of the sensor.

The optical system of the sensor may have an autofocus function. In this case, there is a range of relative positions (distances) between the sensor and the measurement object, within which the autofocus function is capable of setting a focus of the optical system such that the focus lies on the surface of the measurement object. By way of example, the favorable state of movement may therefore be achieved by moving the sensor with respect to at least one mechanical degree of freedom of the movement and thereby achieving a relative position within said range. Therefore, the movement allows the autofocus function to set the focus on the surface of the measurement object.

Typically, the user is also assisted by the coordinate measuring machine in terms of bringing the sensor into the favorable state of movement. In particular, signals may be generated and output by a signaling device of the coordinate measuring machine and signal to the user how they should actuate a movement controller of the coordinate measuring machine in order to achieve the favorable state of movement of the sensor.

The movement controller has different means and/or objects depending on the exemplary embodiment. The means or object allows the user to carry out actuation. In the event of the user exerting forces and/or torques on the optical sensor itself or on an object that is in particular firmly connected to the optical sensor, the optical sensor itself or the object connected to it is the actuation means. For example, in the case of gesture control, i.e., when the user performs gestures, for example with their hands, in order to control the movement of the sensor, the actuation means is the recognition and evaluation device which is configured to recognize the gestures and evaluate them such that the action corresponding to the gesture, in particular the corresponding movement, is controlled.

It is further provided for the coordinate measuring machine also to assist the user in terms of setting an orientation of the sensor in which the measurement object can be measured and which typically corresponds to a second predefined criterion. In particular, if this criterion is satisfied, reference may be made to a favorable orientation. Instead of a favorable orientation, reference may be made to an optimized or improved orientation. In principle, with regard to the nature of the second criterion, the same possibilities for implementing the criterion as explained above in relation to the first criterion are considered. However, since this is an orientation, one way of creating and checking the criterion is to consider not, or not just, the position of the sensor, but rather its orientation. For example, the orientation may be defined as a mathematical vector in the coordinate system of the coordinate measuring machine, in which only the direction of the vector is important, and not its length. In the other type of criterion mentioned above, like for the first criterion, signals generated by the sensor from the capturing of its environment may be evaluated. In particular, the second criterion for an imaging sensor may require a higher quality of the generated image of the surface of the measurement object than the first criterion. By way of example, a sharp image of the surface of the measurement object may be required in a larger part of the image.

Typically, the method also includes the step of measuring the measurement object.

The coordinate measuring machine may assist the user in maintaining the favorable state of movement and/or in setting a favorable orientation of the sensor relative to the measurement object in various ways. Under certain circumstances, this may also depend on the exemplary embodiment of the coordinate measuring machine and in particular on the exemplary embodiment of the person-guided control of the movement of the sensor.

On the one hand, the motor system of the coordinate measuring machine may provide the assistance, for example by applying a force and/or by applying a resistance against an inappropriate movement of the sensor and/or against a change of the favorable state of movement relative to the measurement object and/or against a change of a favorable orientation of the sensor. In particular, therefore, for example, the motor system may inhibit or block a movement of the sensor that would cause the sensor to leave the favorable state of movement or, in an alternative procedure, that would cause the sensor to lose the favorable orientation. Alternatively, the inhibition or blocking can be achieved in other ways, for example with a machine controller of the coordinate measuring machine, which in turn can control the respective motor controller. The machine controller can use, for example, measured values from the position measuring system of the coordinate measuring machine and/or data relating to the shape of the measurement object. Even though the phrase "inhibition or blocking of a movement" has been used, this also includes in particular the case of inhibiting or blocking all movements that lead to the sensor leaving the favorable state of movement or, where applicable, its orientation no longer being a/the favorable orientation.

The applied force and/or resistance can be conveyed to the user with signals that the user can perceive. Such signals will be discussed in more detail. However, it should already be noted here that the signals can also be generated when they are not the result of an action of the motor system. In particular, it is also possible for the assistance of the motor system to consist at least partially in that the sensor is brought fully automatically into the favorable state of movement and/or is kept therein, and/or to consist at least partially in that the sensor is brought fully automatically into the favorable orientation.

In particular, favorable means that the measurement object may be measured. With regard to the favorable state of movement, in some exemplary embodiments, favorable may also mean that the sensor achieves a relative position in relation to the measurement object that is suitable for measuring the measurement object through subsequent setting of the orientation of the sensor. In other words, the relative position is not yet initially suitable for measuring the measurement object or is not yet optimally suitable for this purpose, but is brought to a relative position suitable for measuring the measurement object or a relative position better suited for this by setting the orientation of the sensor.

These statements also apply analogously to another possibility as to how the coordinate measuring machine can provide the assistance. This further possibility can be implemented as an alternative to the possibility of assistance by the motor system or in addition to this possibility of assistance by the motor system. The further possibility includes generating and outputting signals to the user, who may then, on the basis of the signals, actuate the movement controller that they are able to actuate such that the sensor is moved in the assistance direction or, in the case of maintaining the favorable state of movement, is not moved. The assistance provided with the signals has the advantage that the user can move the sensor out of the favorable state of movement and/or set a different orientation of the sensor counter to or as a modification to the assistance signaled by the signals by actuating the movement controller. More generally, the user may ignore all or some of the signals and for example cancel the process of setting the favorable orientation when the favorable state of movement exists.

In particular, the following is provided: A method for operating an optical sensor on a person-guided, motor-assisted coordinate measuring machine, wherein the coordinate measuring machine has a movement controller that can be actuated by a user in order to control a movement of the sensor relative to a measurement object, and wherein the method includes the following steps:

a) identifying that the sensor is in a favorable state of movement relative to the measurement object, wherein the favorable state of movement is a relative position or a range of relative positions in relation to the measurement object in which the sensor captures or can capture a surface of the measurement object and in which a first predefined criterion with regard to a suitability and/or quality of the capturing of the measurement object by the sensor is satisfied, and i) generating and outputting at least one signal perceptible to the user when the sensor is in the favorable state of movement, wherein a first signal signals to the user that the sensor is in the favorable state of movement, and/or if the user actuates the movement controller or attempts to actuate it such that the sensor is to leave the favorable state of movement, the second signal signals to the user that the sensor is leaving the favorable state of movement or that the sensor is to leave the favorable state of movement in accordance with the actuation of the movement controller by the user or that the sensor would have left the favorable state of movement without the presence of the second signal in accordance with the actuation of the movement controller by the user, and/or ii) inhibiting or blocking by machine a movement of the sensor that would cause the sensor to leave the favorable state of movement, and b) in order to achieve an orientation of the sensor favorable for the measurement of the measurement object by the sensor in the favorable state of movement, iii) generating and outputting at least one third signal perceptible to the user and that signals to the user to actuate the movement controller such that the sensor achieves the favorable orientation, and/or iv) controlling by machine a movement of the sensor that causes the sensor to achieve the favorable orientation.

Further, the following is provided: A person-guided, motor-assisted coordinate measuring machine with an optical sensor, wherein the coordinate measuring machine has a movement controller that can be actuated by a user in order to control a movement of the sensor relative to a measurement object, and wherein the coordinate measuring machine includes:

a) an identification device configured to identify that the sensor is in a favorable state of movement relative to the measurement object, wherein the favorable state of movement is a relative position or a range of relative positions in relation to the measurement object in which the sensor captures or can capture a surface of the measurement object and in which a first predefined criterion with regard to a suitability and/or quality of the capturing of the measurement object by the sensor is satisfied, and i) a first signaling device configured to generate and output at least one signal perceptible to the user when the sensor is in the favorable state of movement;
wherein a first signal signals to the user that the sensor is in the favorable state of movement, and/or
if the user actuates the movement controller or attempts to actuate it such that the sensor is to leave the favorable state of movement, a second signal signals to the user that the sensor is leaving the favorable state of movement or that the sensor is to leave the favorable state of movement in accordance with the actuation of the movement controller by the user or that the sensor would have left the favorable state of movement without the presence of the second signal in accordance with the actuation of the movement controller by the user, and/or ii) a blocking device configured to inhibit or block by machine a movement of the sensor that would cause the sensor to leave the favorable state of movement; and b) to set an orientation of the sensor favorable for the measurement of the measurement object by the sensor, iii) a second signaling device, which may be the first signaling device or another signaling device and is configured to generate and output at least one third signal perceptible to the user signaling to the user to actuate the movement controller such that the sensor achieves a favorable orientation of the sensor in the favorable state of movement, and/or iv) a machine controller configured to control by machine a movement of the sensor that causes the sensor to achieve the favorable orientation.

The favorable state of movement has already been discussed above. It exists when the sensor is located in a discrete, in particular predefined relative position in relation to the measurement object or when the sensor is located in an in particular predefined range of relative positions in relation to the measurement object. A relative position corresponds here to a distance between the sensor and the measurement object. While a relative position may be specified for example in a coordinate system of the sensor as a position on the surface of the measurement object, a distance denotes a position difference. The relative position and thus also the corresponding distance may refer in particular to a region of the surface of the measurement object captured or to be captured by the sensor. In this case, a point on the surface of the measurement object on which the relative position or distance is based may remain constant or change due to the subsequent setting of the favorable orientation. The favorable state of movement is maintained whenever, in the case where the favorable state of movement consists of a single relative position, the distance remains constant when the orientation of the sensor is changed, or whenever, in the case where the favorable state of movement consists of a range of relative positions, the distance remains in the corresponding range when the orientation of the sensor is changed. Typically, the relative position refers to a center point of the region captured or to be captured and/or to the point on the surface of the measurement object pierced by the optical axis of the sensor or a predefined axis of an optical sensor. Therefore, the favorable orientation of the sensor may be set for example by rotating about this point. It may however also be set for example by rotating about a fixed point within the optical sensor or near the optical sensor.

An optical axis is understood to mean the axis of symmetry of a rotationally symmetric optical system. In particular, the optical sensor may have such an optical system. However, since the scope of the disclosure also encompasses optical sensors that do not have a rotationally symmetric optical system, it is typical for these sensors to define an axis and to specify the first criterion in relation to this predefined axis. The relative position or relative positions then refer to that surface point of the measurement object that is pierced by the predefined axis. Expediently, the axis is predefined such that it is located in the center or in a central range of the capture range of the sensor. In the case of sensors having a punctiform capture range, it is possible to predefine the axis that connects the sensor in its capture device to the captured point. However, it is also possible, for such sensors, not to define an axis if it is possible to determine in some other way which point on the surface of the measurement object is captured by the sensor at a given orientation.

As explained above, a first signal may signal to the user that the sensor is in the favorable state of movement and/or a second signal may signal to the user that the sensor is leaving the favorable state of movement or that the sensor is to leave the favorable state of movement in accordance with the actuation of the movement controller by the user or that the sensor would have left the favorable state of movement without the presence of the signal in accordance with the actuation of the movement controller by the user. Depending on the exemplary embodiment of the method and coordinate measuring machine, either only the first signal or only the second signal may therefore be generated and output, or both signals may be generated and output. If a movement that would cause the sensor to leave the favorable state of movement is also blocked by machine, then typically only the first signal is generated and output, because in this case the user is not able to control a movement that causes the sensor to leave the favorable state of movement. If, on the other hand, the movement is additionally inhibited by machine, it makes sense to generate and output both the first signal and the second signal. However, both signals do not have to be generated and output.

The phrase that the sensor "is to leave" the favorable state of movement corresponds to the fact that the user does not bring about the movement of the sensor without the assistance of the motor system of the coordinate measuring machine. The nature of the user's influence on the movement of the sensor is that the user gives an instruction by actuating the movement controller. The phrase "actuates or attempts to actuate the movement controller such that the sensor is to leave the favorable state of movement" may therefore also be expressed in equivalent form by the phrase "gives the instruction or attempts to give the instruction, by actuating the movement controller, for the sensor to leave the favorable state of movement".

It should be noted here that, depending on the type of the second signal, the user may also be prevented from actuating, or it may at least be made more difficult for the user to actuate, the movement controller such that it gives the instruction to move the sensor out of the favorable state of movement. One example is the case where the second signal generates a resistance when the movement controller is actuated when the user attempts to give this instruction.

There are therefore multiple cases where the basic principle of generating and outputting the second signal is applied in order to keep the sensor in the favorable state of movement.

In a first case, the user actuates the movement controller such that the sensor is to leave the favorable state of movement. This means for example that either no resistance prevents the user from giving this instruction (and therefore the second signal is output to the user in particular in a different form), or the user has overcome the resistance and still gives the instruction. According to the first case, the second signal signals to the user that the sensor is leaving the favorable state of movement. In particular, this may mean that the sensor will leave the favorable state of movement and that this is no longer able to be prevented, that the sensor is in the process of leaving the favorable state of movement, and/or that the sensor has left the favorable state of movement. If the user has perceived this type of second signal, they may for example actuate the movement controller such that the sensor returns to the favorable state of movement.

In a second case, the user likewise actuates the movement controller such that the sensor is to leave the favorable state of movement. In this second case, the second signal signals to the user that the sensor is to leave the favorable state of movement in accordance with the actuation of the movement controller by the user. In particular, this may mean that the sensor will leave the favorable state of movement, but this can still be prevented, and/or that the sensor is in the process of leaving the favorable state of movement. It is also conceivable for the second signal to mean that the sensor has left the favorable state of movement. However, this is not typical. The user may decide, after perceiving the second signal, whether still to prevent the sensor from leaving the favorable state of movement or whether to terminate the procedure in which the sensor is in the process of leaving the favorable state of movement. In the non-typical case where the sensor has already left the favorable state of movement, the user may in turn decide to actuate the movement controller such that the sensor returns to the favorable state of movement.

According to a third case, the user likewise actuates the movement controller such that the sensor is to leave the favorable state of movement. In this third case, the second signal signals to the user that the sensor would have left the favorable state of movement without the presence of the signal in accordance with the actuation of the movement controller by the user. This means that, although the user has given the instruction that the sensor should leave the favorable state of movement, the motor system of the coordinate measuring machine has not, or not yet, carried out the instruction. In particular, the performance of the movement that leads to the favorable state of movement being left may be delayed, for example by the machine controller. It is also possible for the instruction not yet to be initially accepted in any case, i.e., for example without continuous or additional actuation of the movement controller by the user, the movement that would lead to the sensor leaving the favorable state of movement is not yet performed. The second signal allows the user to recognize that the favorable state of movement would be left, and they may respond by controlling and thus instructing that the favorable state of movement is no longer left by actuating the movement controller. If the performance of the instruction is only delayed when the second signal is output, the user may decide for example to actuate the movement controller such that the sensor is still stopped in time before it leaves the favorable state of movement or that the sensor is moved back to the favorable state of movement after leaving.

According to a fourth case, the user attempts to actuate the movement controller such that the sensor is to leave the favorable state of movement. However, the attempt is not yet successful. In this fourth case, the second signal signals to the user that the sensor is leaving the favorable state of movement. In this case, the second signal signals a state of movement that has not yet been achieved and will also not be achieved in any case due to the attempted instruction. In this case, the user may decide to continue the attempt and actually give the instruction for the sensor to leave the favorable state of movement. However, they may also decide to cancel the attempt, and it is then typically signaled to them that the sensor has not left the favorable state of movement at all.

The fourth case is related to the fifth case in which the user attempts to actuate the movement controller such that the sensor is to leave the favorable state of movement. However, the attempt is not yet successful. The second signal signals that the sensor is to leave the favorable state of movement in accordance with the actuation of the movement controller by the user, although this instruction has not actually yet been given. In this case, the user may decide to continue the attempt and actually give the instruction for the sensor to leave the favorable state of movement. However, they may also decide to cancel the attempt, and it is then typically signaled to them that the sensor has not left the favorable state of movement.

According to a sixth case, the user attempts to actuate the movement controller such that the sensor is to leave the favorable state of movement. However, the attempt is not yet successful. In this sixth case, the second signal signals to the user that the sensor would have left the favorable state of movement without the presence of the signal in accordance with the actuation of the movement controller by the user. The example whereby the second signal forms a resistance against the actuation with the instruction for the sensor to leave the favorable state of movement concerns this sixth case in particular. In simpler terms, the user attempts to actuate the movement controller such that the sensor leaves the favorable state of movement. However, as long as they do not overcome the resistance, the user will not be able to give the instruction for the sensor to leave the favorable state of movement. Another example of the sixth case is a visual display that allows the user to perceive that, if actuation of the movement controller that has been started is continued, the instruction would arise for the sensor to leave the favorable state of movement. By way of example, when the user exerts a force on an actuation means, a bar that is initially still of short length may be visually displayed. If the force increases over time or if an objective actuation means is increasingly deflected further from a rest position by the force, the length of the displayed bar becomes continuously greater. By way of example, a marker for a maximum bar length is also displayed visually, which would then result in the instruction for the sensor to leave the favorable state of movement. The user may therefore prevent the instruction from arising by changing the actuation of the movement controller. By way of example, they may reduce the force exerted on the actuation means or stop exerting the force.

A machine controller of the coordinate measuring machine may be configured in accordance with the cases just set forth. In particular, the first signaling device may also transmit the first signal to the machine controller and the machine controller may further receive or have available the information as to what movement of the sensor would lead to the favorable state of movement being left. The machine controller has the function of actuating the motor system of the coordinate measuring machine in accordance with the user's instructions. The instructions are the user's instructions when they actuate the movement controller in order to control a movement of the sensor.

In one exemplary embodiment, the user has the possibility of controlling leaving of the favorable state of movement. This also applies to exemplary embodiments in which such a movement is inhibited or blocked by machine. Typically, there is an operating mode for the actuation of the movement controller that signals that the favorable state of movement is to be left. In particular, if the performance of a movement in accordance with an actuation of the movement controller such that the sensor is to leave the favorable state of movement as described above is delayed, the user may continue the actuation and thereby signal that the favorable state of movement is to be left. In particular, it may therefore be identified that the user maintains the actuation of the movement controller for the purpose of leaving the favorable state of movement for more than a predefined minimum duration and a machine controller of the coordinate measuring machine may then in particular perform the movement in accordance with the actuation. This procedure may however, as an alternative or in addition, also be adopted if the user exerts a predefined minimum force and/or a predetermined minimum torque on an actuation means (such as for example a joystick) of the movement controller.

As explained above, the favorable orientation of the sensor may be set by machine control of a movement of the sensor and/or by control of the user, who actuates the movement controller taking into consideration the third signal. This therefore includes, depending on the embodiment of the method and of the coordinate measuring machine, the case in which the favorable orientation is set exclusively by machine control and thus without taking into consideration any actuation action of the user. As an alternative, actuation of the movement controller by the user is also taken into consideration here. Furthermore, as an alternative, the user controls the movement of the sensor into the favorable orientation alone, but (as in the case of joint consideration as well) after and/or during reception of the at least one third signal. When jointly considering the actuation of the movement controller by the user, the user may for example specify or influence the speed or acceleration of the movement through their actuation and/or the user may for example bring about deviations from the movement path that would have been performed without their actuation. Typically, however, the machine control in the joint consideration in any case causes the sensor to achieve the favorable orientation. It also makes sense to jointly consider the actuation by the user if there are multiple favorable orientations and the user influences or specifies which of these orientations the sensor achieves through their actuation.

The signals mentioned, which are generated and output such that the user can perceive them, may be of different types. For example, it is possible to provide a force generator which is configured to exert a force on an actuation means (such as a joystick) of the movement controller or (in the case of a correspondingly different exemplary embodiment) on the sensor or the object connected to it. In particular, if the sensor or the object connected to it is the actuation means, the motor system of the coordinate measuring machine may therefore have the function of the force generator.

The force can produce, for example, resistance to a force exerted by the user on the actuation means or the sensor, i.e., the two forces may be opposed to each other. For example, the resistance force can be generated only when the user exerts a force on the actuation means which is considered unsuitable by a machine controller of the coordinate measuring machine with regard to the current operating situation. The force is unsuitable for example if the sensor is in the favorable state of movement and the force would cause the sensor to leave the favorable state of movement. In another operating situation, for example, the force is unsuitable if it controls a movement of the sensor that does not lead to the favorable orientation of the sensor or leads to the orientation on an unsuitable or unfavorable movement path. The force generator may also be or have a brake, for example, that decelerates a movement of the actuation means caused by the user. In many cases, based on the favorable state of movement of the sensor, there is at least one suitable direction of movement of the actuation means that leads to a movement of the sensor that brings it to the favorable orientation. In these cases, there are usually, at the same time, multiple unsuitable directions of movement of the actuation means that lead to the sensor leaving the favorable state of movement. The force generator is therefore typically controlled by the machine controller of the coordinate measuring machine in such a way that it generates a resistance force only when the actuation means is moved in one of the unsuitable directions of movement. In particular, said resistance force is an increased resistance force if the actuation means must always be actuated against a resistance force, as typical. In a variant of the use of the abovementioned force generator or when applying the resistance force, the resistance force as a signal to the user is so great that the user feels that a movement counter to the direction of the resistance force is blocked. Optionally, in this case, the user can overcome this high resistance force by applying an even higher user force and thereby specifying that the generation of the resistance force or the increased resistance force is terminated. The user thereby signals for example that the sensor is to leave the favorable state of movement.

As an alternative or in addition to a resistance force or counterforce exerted on an actuation means, it is possible to act on the actuation means in another manner in order to make the respective signal perceptible to the user, or the signal may be made directly perceptible to the user. One possibility is to generate a mechanical vibration of the actuation means by way of at least one vibrator when the user actuates the actuation means in an unsuitable manner in the sense described above. As an alternative or in addition to the mechanical vibration, an electrical voltage, which can be perceived by the user, can be applied to the actuation means.

The at least one vibrator and/or a voltage generator for generating an electrical voltage can, however, also be applied to an object other than that used by the user (for example a garment such as a glove) and/or directly to a body part of the user. In particular, the electrical voltage may have at least one voltage pulse, i.e., it may only have a short-term effect per pulse.

Another possibility is to output a visual and/or acoustically perceptible signal to the user. In the case of a visual signal, the signal can be displayed perceptibly to the user, for example via a display, for example as a bar display and/or using colors. For example, a displayed bar becomes longer, the more unsuitable or (in another case) more suitable a user-actuated and thus intended movement of the sensor. Acoustically perceptible signals may in particular use different audible frequencies to indicate to the user whether an actuation action is suitable or unsuitable, or to gradually indicate the extent to which an actuation action is suitable or unsuitable. Acoustically perceptible signals can also be indicated in the manner of a surround system known from virtual reality. For example, a sound image apparently coming from the forward direction and/or viewing direction of the user can signal suitable actuation, whereas other apparent directions of origin of the sound image signal a deviation from suitable actuation. The user can then modify the actuation of the movement controller such that the sound image apparently comes from the forward direction again.

Furthermore, the actuation of the movement controller by the user, in particular in all these cases in which the signal is not output to the user via the actuation means, can manage without a concrete actuation means. The abovementioned gestures which are used by the user to perform actuation are one example.

In particular, the optical sensor is an imaging sensor that has a non-punctiform capture range for capturing at least part of a measurement object from a fixed relative position of the sensor and the measurement object and with a fixed orientation of the sensor. A fixed relative position is understood to mean that the sensor not only has a punctiform capture range from this relative position with a fixed orientation relative to the measurement object, but also captures the measurement object in a spatially resolved manner. Such an optical imaging sensor is referred to as an "imaging sensor" because the information that it captures makes it possible to generate an image of the captured region of the measurement object. The disclosure is particularly advantageous with regard to such an imaging sensor, since the quality of images in many cases depends significantly on orientation. For an imaging sensor, the first predefined criterion may be defined with respect to the sharpness of the image, wherein setting the favorable orientation typically improves the sharpness of the image or increases the proportion of the image that depicts the surface of the measurement object sharply. The fixed relative position of the sensor and the measurement object and the fixed orientation are changeable. The term "fixed" simply means that no relative movement is required between the sensor and the measurement object to capture an image.

Typically, signals are also generated and output and signal to the user how they should actuate the movement controller to achieve the favorable state of movement of the sensor. In this case, the favorable state of movement may be defined in particular with respect to a relative position or a range of relative positions of the sensor relative to a predefined surface point on the surface of the measurement object. In this case, the method or the coordinate measuring machine may also assist the user in the measurement of at least a predefined surface point or a surface region around this point.

For imaging sensors, the favorable state of movement may be achieved in particular also or exclusively by setting properties of an optical system of the sensor. The ability to set properties of the optical system may be referred to as an optical degree of freedom. The favorable state of movement in this case, for example for autofocus sensors, consists in that the current relative position is a position in which the image generated by the sensor of the surface of the measurement object is sharp at least in a subregion of the image. If the favorable state of movement is a range of relative positions in the case of such optical sensors, this range may be defined for example in that it makes it possible to focus part of the generated image in any relative position of the region and in particular to focus a region around a surface point of the measurement object, wherein the surface point is the point of incidence of the optical axis or of the predefined axis of the sensor on the surface. Even with such a range of relative positions, however, it is typical for the favorable state of movement to contain only a partial range of the relative positions, namely a partial range in the center of the range of relative positions. This means that there is a tolerance for a change in relative position, in particular while setting the favorable orientation of the sensor, and a sharp image region is still able to be set. The size of the image region that is focused or able to be focused may then be increased by setting the favorable orientation, at least if the surface of the measurement object in the captured region is flat or roughly flat. However, the favorable state of movement may also be the entire range of relative positions in which it is possible to focus an image region. It is particularly typical for the sensor to be positioned so that the exact center of this range of relative positions is set, i.e., the sensor has the relative position of the center of the range of relative positions in relation to the measurement object. If this is identified, then the remaining substeps of step a) and step b) of the method set forth above or of the corresponding coordinate measuring machine may also be carried out.

Typically, a point on the surface of the measurement object at which an optical axis or the abovementioned predefined axis pierces the surface is focused.

Autofocus functions of optical sensors can be implemented in different ways. It has long been known, for example, to combine an optical system having a zoom function based on the setting of the distance between individual lens elements of the system with a device for identifying a sharp image. For example, by setting the distance between the lens elements, the focus can be changed in such a way that the viewed image region is imaged sharply, and in particular can be changed until the viewed image region is imaged sharply.

Alternatively, other systems with an autofocus function can be used, in which the focus setting is carried out, for example, with a Micro-Mirror Array Lens System (MALS), as used, for example, in the digital microscope Visioner 1 from the Carl Zeiss AG group of companies, Oberkochen, Germany, or based on liquid lens technology, in which the shape of at least one lens element is usually set by changing an electric field in order to change the focal distance, or based on focus tunable lens technology, in which the shape of the lens element and thus the focal distance is set with a fluid flow and corresponding deformation of at least one lens element.

The favorable state of movement may also be achieved by the user positioning the sensor in one of multiple possible relative positions in relation to a region of the surface of the measurement object to be captured and thereby being assisted by the motor system of the coordinate measuring machine. The user controls the positioning, as is already known per se, by actuating the movement controller of the coordinate measuring machine. In this set relative position, the autofocus function of the sensor sets the focus distance so that the focus lies in the surface region to be imaged.

When the state of movement is achieved, or even only thereafter, but the favorable state of movement still persists, then the process as described above is carried out, i.e., the user is assisted in achieving the favorable state of movement and is in the process assisted with setting the favorable orientation of the sensor. The term "assist", as also described above, includes, depending on the exemplary embodiment, inhibiting or blocking by machine a movement of the sensor that would cause the sensor to leave the favorable state of movement, and/or controlling by machine a movement of the sensor that causes the sensor to achieve the favorable orientation.

In one exemplary embodiment of the method, the following additional step is therefore carried out after achieving the favorable state of movement: automatically setting a focus of an optical system of the sensor on the surface of the measurement object in a region of the surface of the measurement object captured by the sensor. This corresponds to an exemplary embodiment of the coordinate measuring machine in which a setting device of the optical sensor is configured to set a focus of an optical system of the sensor on the surface of the measurement object in a region of the surface of the measurement object captured by the sensor when the favorable state of movement exists.

For example, the focus setting may be triggered by the user, for example by virtue of the user generating a corresponding actuation signal. With respect to the method, this means that the actuation signal is received from the user and triggers the setting of the focus. With regard to the coordinate measuring machine, there may be an interface for receiving the actuation signal, or the coordinate measuring machine has an actuation means, such as for example a pressure-sensitive sensor. The reception or generation of the actuation signal by the user leads, in this exemplary embodiment of the coordinate measuring machine, to the focus of the optical system of the optical sensor being set. If the optical sensor with its optical system is an arrangement able to be detached from the coordinate measuring machine, then the sensor may be connected, in the state coupled to the coordinate measuring machine, to the remaining part of the coordinate measuring machine via a signal line. Said remaining part includes at least the user-actuable movement controller and the motor system of the coordinate measuring machine, and also possibly the machine controller of the coordinate measuring machine that is present in addition to the motor system. It is also possible for the control device, which controls the setting of the focus, and which also evaluates the image information from the sensor required for this purpose, to be integrated into the remaining part of the coordinate measuring machine. This control device may therefore for example be part of the mentioned machine controller of the coordinate measuring machine.

In all cases where the optical sensor has an autofocus function or is combined with such a function, the focus may be set on the surface of the measurement object for example continuously or at a certain time or at multiple times. Such a time is typically after the favorable state of movement has been achieved, but before the favorable orientation of the sensor has been set. This has the advantage that it is possible to check, based on an image obtained after the focus has been set, whether the favorable state of movement is actually favorable. Another such time of setting of the focus, which may in some cases also be the only time of setting of the focus, is after the setting of the favorable orientation of the sensor. This ensures that the focus is set correctly for the recording of at least one image that then starts. Even though it may be assumed in many cases that a focus set beforehand in the favorable state of movement on the surface of the measurement object is still on the surface of the measurement object after the favorable orientation of the sensor has been set, it may make sense to check or reset the focus.

If it turns out, in the favorable state of movement, that the focus cannot be set in the region of the surface of the measurement object to be captured, then it may be decided, for example by an image evaluation device of the coordinate measuring machine, that there is no favorable state of movement. In this case, the outputting of corresponding signals to the user and any inhibition or blocking by machine of a movement of the sensor is cancelled. In particular, taking into consideration an evaluation result of the image evaluation device, it is then possible to determine what relative position or what range of relative positions represents a favorable state of movement. This changed favorable state of movement may then be set by moving the sensor, specifically controlled by the user and/or by controlling the movement of the sensor by machine. If the user controls the movement, the description applies analogously in any exemplary embodiment with regard to the setting of the favorable orientation of the sensor.

In general, an imaging optical sensor, as already mentioned for example in relation to the recording of a focus stack, may record more than a two-dimensional image of the surface of the measurement object in the current relative position in relation to the measurement object. In a manner known per se, a point cloud of the captured surface points of the measurement object may be generated therefrom. A point cloud is understood to mean that the recorded points lie in a three-dimensional space.

With regard to the present disclosure, this means that, after the favorable orientation has been reached, the two-dimensional images start being recorded. In particular, the favorable orientation is maintained while recording the images, or an appropriate other favorable orientation may be set for recording individual images. In this case, at least one third signal perceptible to the user may likewise be generated and output and signal to the user to actuate the movement controller such that the sensor achieves the favorable orientation. As an alternative or in addition, the movement of the sensor to achieve the (other) favorable orientation may be performed through machine control of the movement. For example, the abovementioned MALS systems, depending on the exemplary embodiment, in the case of a favorable orientation of the sensor, may image one or more images of the measurement object if the optical axis or the predefined axis of the system is not perpendicular to the surface of the measurement object. Different inclinations of the optical axis or of the predefined axis in relation to the surface normal and thus different favorable orientations of the optical sensor may also make sense if multiple images of the measurement object are recorded using a MALS system but the favorable state of movement is in the process maintained. In this case and in other cases, the user may therefore be assisted during the recording of the image information by the optical sensor as already described in terms of achieving the favorable state of movement, wherein, as described, different favorable orientations of the sensor are nevertheless set.

It has already been mentioned at the outset that the movement of the sensor should be understood to mean a relative movement of the sensor in relation to the measurement object. At least one degree of freedom of the movement may therefore be realized by the measurement object being moved relative to a fixed base.

It is generally typical, in any exemplary embodiment of the method and the coordinate measuring machine, for the user also to be assisted in achieving the set favorable orientation of the sensor. In this respect, the same method steps or functionalities of the coordinate measuring machine as when achieving the favorable state of movement apply analogously. This therefore includes generating and outputting at least one signal perceptible to the user and/or inhibiting or blocking by machine a movement of the sensor that would cause the sensor to leave the favorable orientation, i.e., that would lead to a different orientation.

In particular, a settable illumination device may additionally be present and illuminates the surface of the measurement object in the region to be captured during operation thereof. Setting the illumination device makes it possible to change the illumination (for example the spatial distribution of the illumination intensity) such that it is improved or optimized with regard to the capturing of the surface by the sensor. The illumination device may be configured to carry out the setting fully automatically with improved or optimized illumination. As an alternative, the user may control the setting of the illumination device by actuating a corresponding actuation device. In this case, everything described in this description regarding the user-controlled setting of the favorable orientation of the sensor applies analogously. In particular, a signal perceptible to the user may be generated and output and signal to the user to control the setting such that the illumination device generates the improved or optimized illumination.

BRIEF DESCRIPTION OF THE DRAWINGS

The disclosure will now be described with reference to the drawings wherein.

DESCRIPTION OF EXEMPLARY EMBODIMENTS

Figure 1:
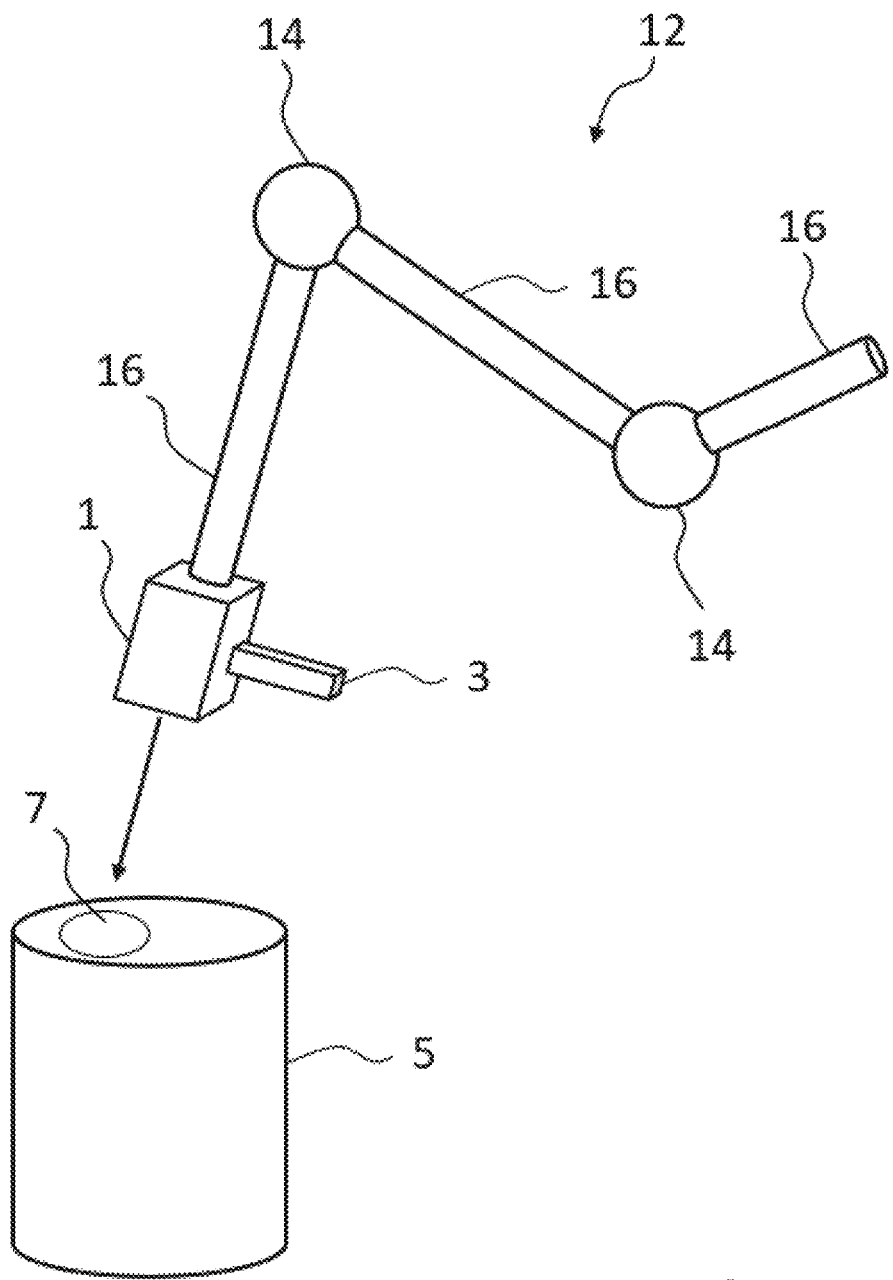
FIG. 1 shows a part of a mechanism of a coordinate measuring machine with an optical sensor that is coupled to the mechanism and is aligned with a region of a workpiece to be captured.

FIG. 1 shows a mechanism 12 of a coordinate measuring machine that is otherwise not further illustrated in FIG. 1. In this specific exemplary embodiment, the mechanism 12 is of articulated arm design. However, the disclosure is not limited to this type of mechanism. The mechanism 12 has arms 16 which are movably coupled to each other via joints 14. An optical sensor 1 is arranged at a free end of one of the arms 16. An axis of the optical sensor 1, which is represented by an arrow in FIG. 1, corresponds to a main viewing direction of the sensor 1 and is directed to a region 7 to be captured on a surface of a workpiece 5. The workpiece 5 is an example of a measurement object. Furthermore, a handle 3 is fixed to the optical sensor 1 as an actuation means. A user can grip the handle 3 and control a movement of the optical sensor 1 by exerting forces on the handle 3 and thus also on the optical sensor 1. Since it is a motor-assisted coordinate measuring machine and therefore, in particular with reference to this example of a mechanism 12, rotational movements around the axes of rotation of the joints 14 are motor-driven, the movement performed by the user via the handle 3 is motor-assisted. In particular, the motor system can also perform weight balancing such that the weight of the optical sensor 1 and of the components of the mechanism 12 does not lead to an unintentional movement. For example, if the user does not exert any force on the handle, the weight balancing results in the optical sensor 1 maintaining its position and orientation. On the other hand, if the user exerts a force on the handle 3, the motor system (possibly with the exception of certain operating states) assists the user in ensuring that the sensor 1 performs the desired movement. In particular, the motor system and/or a position measuring system of the coordinate measuring machine not illustrated in FIG. 1 can identify the movement of the optical sensor 1 initially caused by the exerted force and can generate a movement in the same direction as the exerted force by motor. In this case, the amount of force and/or the period for which the force is exerted may be a measure of the speed or acceleration with which the optical sensor 1 is intended to be moved. The motor system then performs the movement with this speed or acceleration. Such person-guided movements of objects are already known, e.g., in lifting apparatuses, and, with regard to fewer degrees of freedom of the movement, also in coordinate measuring machines. One example is the coordinate measuring machine called ScanMax which is offered by Carl Zeiss Industrielle Messtechnik GmbH, Oberkochen, Germany. However, the procedure and the coordinate measuring machine of the present disclosure are not limited to the movement of the sensor with only a single degree of freedom or with a small number of degrees of freedom of the movement.

Figure 2:
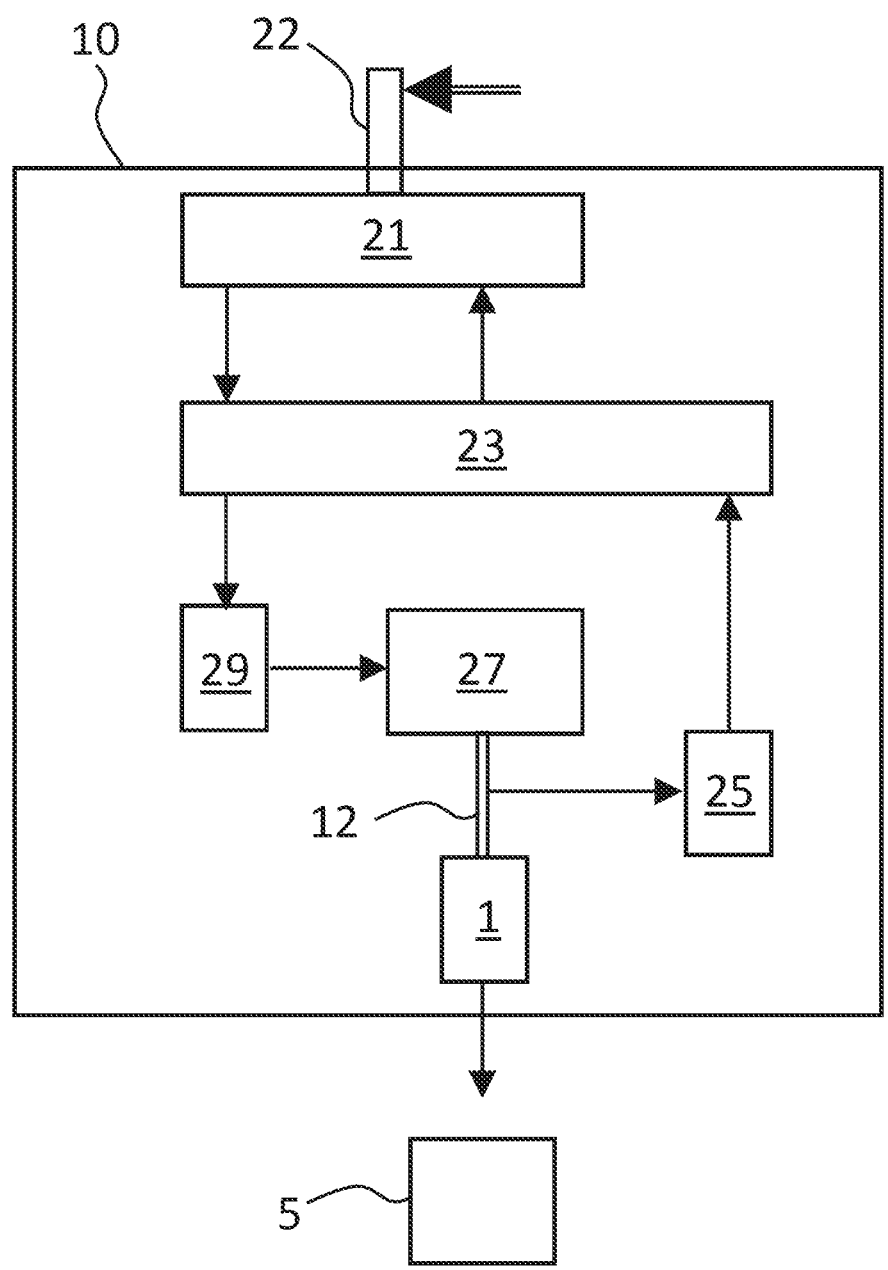
FIG. 2 shows a schematic block diagram of a coordinate measuring machine with an optical sensor, e.g., the coordinate measuring machine, to which the mechanism illustrated in FIG. 1 belongs.

The schematic block diagram in FIG. 2 shows a coordinate measuring machine 10 which has an optical sensor 1. The same reference signs in different figures denote the same or corresponding devices and objects. Therefore, the optical sensor 1 in FIG. 2 can be for example the optical sensor 1 from FIG. 1. The optical sensor 1 in FIG. 2 is movable via a mechanism 12 and the mechanism 12 is driven by a drive 27 which has at least one motor and usually has a plurality of motors. A drive controller 29 controls the drive according to instructions which are received by the drive controller 29 from a machine controller 23 of the coordinate measuring machine 10.

Arrows in FIG. 2 illustrate a respective control effect or signal transmission or information acquisition. For example, the sensor 1 captures a workpiece 5, as indicated by an arrow. The drive controller 29 controls the drive 27, wherein optionally (not illustrated) the drive 27, for example, can transmit signals from a tacho generator to the drive controller 29, with the result that the drive controller 29 can control the state of movement of the drive 27 according to the instructions.

A position measuring system 25 of the coordinate measuring machine 10 measures positions and/or orientations of the mechanism 12 and thus of the optical sensor 1 arranged on the mechanism 12. Position determination results are transmitted by the position measuring system 25 to the machine controller 23. Furthermore, a movement controller 21 is provided and allows a user to control a movement of the optical sensor 1 via an actuation means 22. Control signals generated in this way are transmitted from the movement controller 21 to the machine controller 23. Conversely, the machine controller 23 is able, in particular in certain operating states, to generate signals that can be perceived by the user after being output to the latter. In particular, in the exemplary embodiment specifically illustrated here, the signals generated by the machine controller 23 are output via the movement controller 21 and the actuation means 22. Other possibilities, such as an acoustic or visual representation, have already been mentioned. Further, the actuation means 22 may be the optical sensor 1 or an object that is in particular firmly connected to the sensor 1, as illustrated in FIG. 1.

Figure 3:
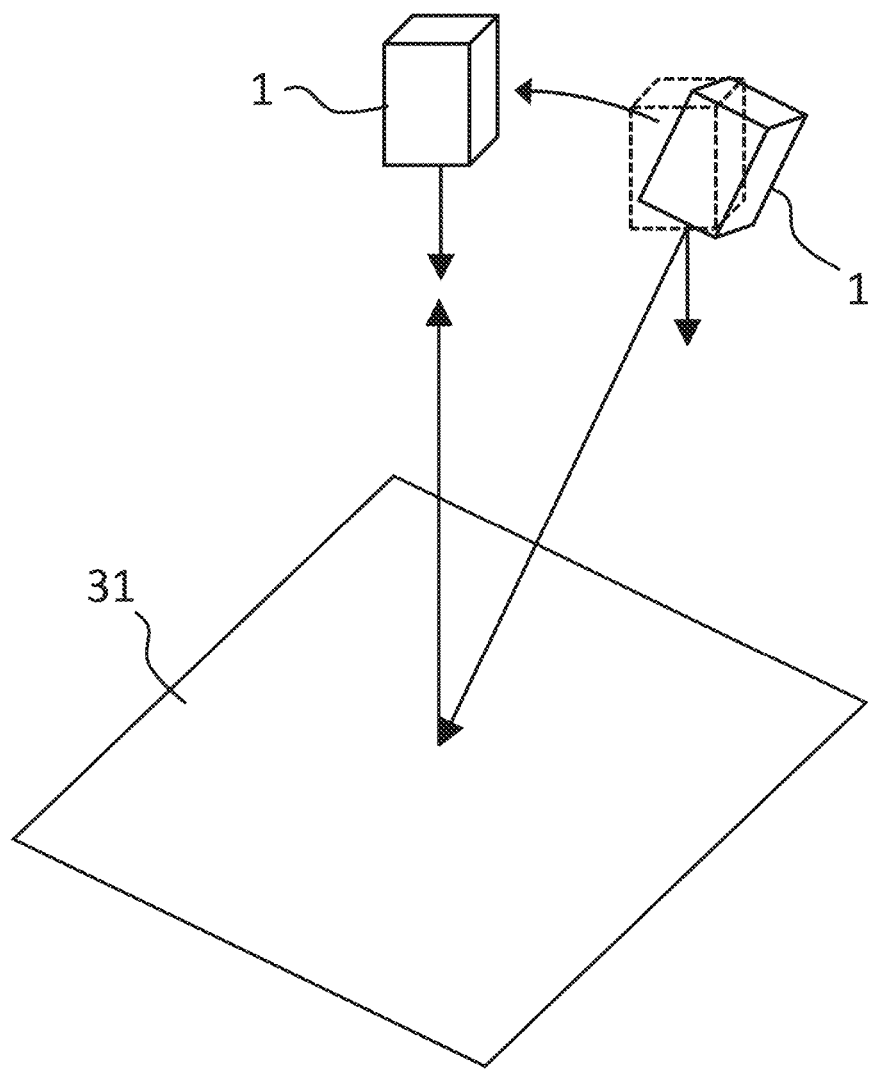
FIG. 3 shows an illustration showing the setting of a favorable orientation of an optical sensor relative to a surface of a measurement object illustrated schematically as a flat surface, FIG. 4 schematically shows a flowchart of method steps of a first exemplary embodiment of the method for operating an optical sensor, FIG. 5 schematically shows a flowchart of method steps of a second exemplary embodiment of the method for operating an optical sensor, and FIG. 6 schematically shows a flowchart of method steps of a third exemplary embodiment of the method for operating an optical sensor.

FIG. 3 shows an optical sensor 1 in two different positions and orientations. Further to the right in FIG. 3, the optical sensor 1 is illustrated with a viewing direction to the bottom left (as indicated by a long arrow) onto a surface of a measurement object. This viewing direction does not coincide with the direction of the surface normal of the surface 31. The surface normal is represented by an arrow running vertically upward in FIG. 3. However, after the sensor 1 has been brought into a different orientation relative to the surface 31 of the measurement object, as indicated by a curved arrow, the viewing direction of the optical sensor 1 and the surface normal correspond to each other. However, the surface normal is usually represented by a direction vector pointing away from the surface, with the result that the viewing direction and the surface normal vector are directed in opposite directions.

In the exemplary embodiment illustrated in FIG. 3, the sensor 1 is located in both positions illustrated in what is referred to as the favorable state of movement, i.e., its distance from or relative position in relation to the surface 31 satisfies the first predefined criterion with regard to a suitability and/or quality of the capturing of the measurement object by the sensor 1. In the example illustrated, the distance and thus the relative position of the sensor 1 in relation to the surface 31 remains constant even during the rotation of the sensor 1 in order to set its orientation. In the position of the optical sensor 1 illustrated further to the left in FIG. 3, it has achieved its favorable orientation in relation to the surface 31 of the measurement object. In the specific exemplary embodiment, the favorable orientation is achieved when the viewing direction of the sensor 1 corresponds to the surface normal of the surface 31. However, this is different in other exemplary embodiments, namely in particular for optical sensors that are not intended to look exactly perpendicular onto a surface when measuring the surface of a measurement object.

In the exemplary embodiment illustrated in FIG. 3, the optical sensor is rotated, in order to set the favorable orientation, about the center of rotation that is defined by the point at which the visual axis (e.g., optical axis or predefined axis) of the optical sensor 1 is already looking in the starting position.

In other words, the viewing axis pierces the center of rotation on the surface of the workpiece. This may also be different in other exemplary embodiments. For example, the optical sensor 1 could be rotated from its starting position further to the right in FIG. 3 about a center of rotation that lies within the optical sensor 1. In this case, the position of the optical sensor 1 in space is not changed, or is changed only slightly, and it achieves the position and orientation shown by dashed lines in FIG. 3. Again, this is just one exemplary embodiment. The center of rotation may be located anywhere else. Furthermore, it does not have to be a center of rotation that is fixed in space during rotation of the optical sensor. On the contrary, at least one linear movement may be overlaid on the rotation in space.

According to the method described before the description of the figures, it is identified (in particular following a corresponding movement of the sensor) that said sensor is in a favorable state of movement relative to a measurement object. In the state of movement, a first predetermined criterion with regard to a suitability and/or quality of the capturing of the measurement object by the sensor is satisfied. The coordinate measuring machine has an identification device for this purpose. Again, with reference to FIG. 2, the identification device may be for example the machine controller 23, which receives the information for identifying whether the first predefined criterion is satisfied from the position measuring system 25. However, additional information is required here as to what position the measurement object is in. Particularly in the case of irregularly shaped measurement objects, this additional information may be based on a previously performed position determination and orientation determination of the measurement object and optionally on data about the shape of the measurement object, such as for example CAD data.

The first signaling device of the coordinate measuring machine, which was mentioned above and is configured to generate and output at least one signal perceptible to the user when the sensor is in the favorable state of movement, may be implemented with reference to the exemplary embodiment of FIG. 2, for example, by a combination of the machine controller 23 (which generates the at least one signal) and the movement controller 21 (which outputs the signal to the user).

A blocking device that inhibits or blocks a movement of the sensor by machine, this movement being such a movement that would cause the sensor to leave the favorable state of movement, may be implemented with reference to the exemplary embodiment of FIG. 2, for example, by a combination of the machine controller 23 with the drive controller 29 and the drive 27. As an alternative or in addition, provision may be made for a brake that is configured to inhibit or block a degree of freedom, associated therewith, of the movement. The machine controller 23 actuates the drive controller 29, for example, such that it causes the drive 27 to block or inhibit the movement. In this case, the machine controller 23 can access the information that it receives from the movement controller 21. If the user actuates for example the actuation means 22 such that the movement controller 21 requests a movement that would cause the sensor to leave the favorable state of movement, then the machine controller 23 calculates whether the entire movement or for example only individual movement components of the movement are to be inhibited or blocked.

The abovementioned second signaling device, which is configured to generate and output at least one third signal perceptible to the user signaling to the user to actuate the movement controller such that the sensor achieves a favorable orientation in the favorable state of movement, may again be implemented in the same way as described by a combination of the device controller 23 with the movement controller 21.

Finally, with reference to the example of FIG. 2, the machine controller 23 may control by machine a movement of the sensor that causes the sensor to achieve the favorable orientation. Again, the control process of the machine controller is based here for example on the position information and orientation information received from the position measuring system 25. In order to ensure here that the favorable state of movement is maintained, the machine controller 23 may again also access the information about the position and about the orientation and optionally the shape of the measurement object 5.

Figure 4:
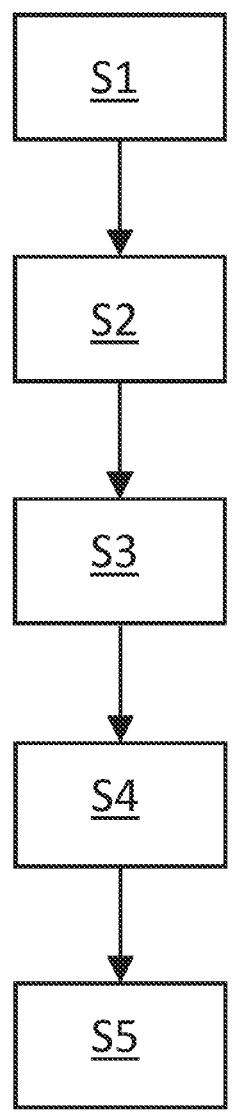

FIG. 4 shows a flowchart setting forth method steps of a first exemplary embodiment of a method for operating an optical sensor. In a first step S1, the optical sensor, which is operated on a person-guided, motor-assisted coordinate measuring machine, is controlled by a user into a relative position in relation to a measurement object. For example, it is identified in a following step S2, in a manner triggered by actuation of the user, that the sensor is in a favorable state of movement in relation to the measurement object. The abovementioned first predetermined criterion is checked here and identified to have been satisfied. In a following step S3, a first signal is generated and for example output via the actuation means used by the user to control the movement. This signal signals to the user that the sensor is in the favorable state of movement. For example, the user may then stop controlling a movement of the sensor and instead, in a following step S4, request for the sensor to be brought into a favorable orientation. In a following step S5, for example, the abovementioned machine controller of the coordinate measuring machine uses the drive controller and the drive of the coordinate measuring machine to automatically control a rotational movement of the sensor that causes it to reach the favorable orientation. Optionally, for example as part of step S3, the degrees of freedom of the movement of the sensor may be inhibited or blocked such that only a rotational movement of the sensor that allows it to be brought into the favorable orientation is still possible. This has the advantage that the user is also not able to inadvertently control a movement of the sensor that leads to the sensor leaving the favorable state of movement.

If the sensor is a sensor with an autofocus function, the focus may be set onto the surface of the object to be captured at some point after step S3. This may also optionally be repeated.

Figure 5:
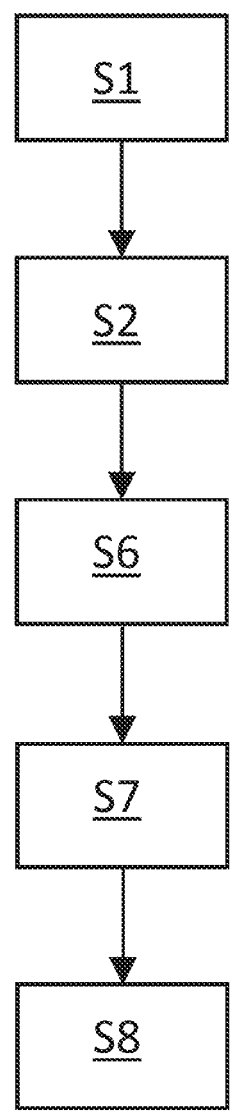

FIG. 5 shows a flowchart containing method steps of a second exemplary embodiment of the method. The same references for method steps denote the same method steps as described with reference to FIG. 4. Therefore, in this method as well, the sensor is brought into a favorable state of movement (step S1) and it is identified in step S2 that this favorable state of movement has been achieved. In step S6 that then follows, however, it is not, or not just, signaled that the sensor is in the favorable state of movement. On the contrary, in step S6, if the user actuates the movement controller such that the sensor is to leave the favorable state of movement, a signal is generated and output to the user, based on which the user can conclude that the sensor is leaving the favorable state of movement. The user may then actuate the movement controller to ensure that the favorable state of movement is achieved again. As an alternative, the signal may signal to the user that the sensor is to leave the favorable state of movement in accordance with the actuation of the movement controller by the user. At the same time, however, for example, the device controller of the coordinate measuring machine delays the performance of this movement. This gives the user the opportunity to recognize that the movement that they control causes the sensor to leave the favorable state of movement.

The following step S7 identifies that the user has continued the actuation of the movement controller such that the sensor is to leave the favorable state of movement. In the following step S8, the movement controlled by the user is therefore performed and the sensor leaves the favorable state of movement.

Figure 6:
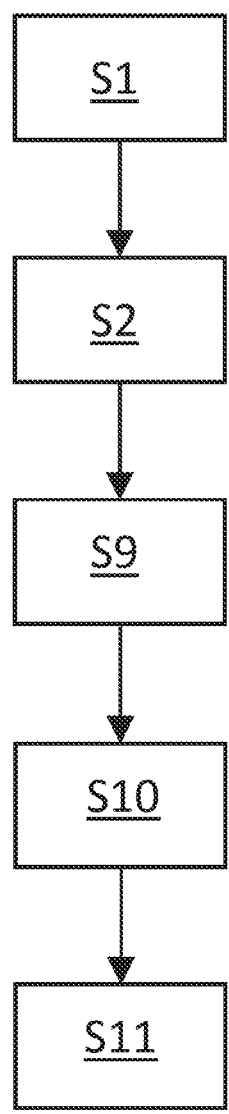

FIG. 6 schematically illustrates a method using steps starting with steps S1 and S2 from FIG. 4 and FIG. 5. In step S9 following step S2, it is signaled to the user that the sensor is in the favorable state of movement. In the following step S10, it is identified that the user requests to set the favorable orientation of the sensor or the setting of the favorable state of movement is signaled automatically as a result of the favorable state of movement having been achieved. In the following step S11, the sensor is moved such that it achieves the favorable orientation by the user actuating the movement controller. In this case, it is signaled to the user, where applicable, if they actuate the movement controller such that the sensor is to leave the favorable state of movement, that the sensor would leave the favorable state of movement if the movement as requested by the user is performed. The performance of the movement may again be delayed to allow the user to perform another movement.

As an alternative, the signal, in particular in the example of resistance described above, may signal to the user, through the resistance, that the user would actually cause the favorable state of movement to be left if the resistance were to be overcome. The actuation of the movement controller that leads to the resistance would, without the resistance, lead directly to the favorable state of movement being left. This may therefore also be understood as an actuation attempt to cause the sensor to leave the favorable state of movement. However, if the resistance is not overcome by the user, the sensor remains in the favorable state of movement and the resistance has merely signaled to the user that they would have caused the favorable state of movement to be left in accordance with the actuation of the movement controller.

In one specific exemplary embodiment, for example, only when the resistance applied by the second signal is overcome is it possible to perform the movement of the sensor so as to leave the favorable state of movement. However, resistance is not the only option. It has already been mentioned above that for example a signal such as for example a mechanical vibration or an acoustic signal at a certain frequency may be generated. Such a signal may be generated and output as a warning signal and may also be understood as such by the user. Since any movement controller is subject to a certain time delay until the movement is also actually performed, the warning signal may also be output before the movement requested by the user is performed. The user may then actuate the movement controller such that, for example, a reverse movement of the sensor is requested or at least a modified movement of the sensor is requested, and it does not leave the favorable state of movement. Not just with reference to the exemplary embodiment specifically illustrated here, the warning signal may however also be output when the user is about to request that the sensor leave the favorable state of movement. In this case, it is concluded that the user will request that the favorable state of movement be left (and this request is imminent), because the sensor is already located for example at the edge of the favorable state of movement (in the case where the favorable state of movement has a range of relative positions in relation to the measurement object). This conclusion may be drawn even if a continuous process of actuation of the movement controller by the user has already progressed, and it may be concluded from this process that the user is about to request that the favorable state of movement be left.

LIST OF REFERENCE NUMERALS

1 Optical sensor
3 Handle
5 Workpiece (measurement object)
7 Region to be captured
10 Coordinate measuring machine
12 Mechanism
14 Joint
16 Arm
21 Movement controller
22 Actuation means
23 Machine controller
25 Position measuring system
27 Drive
29 Drive controller
31 Surface of the measurement object

What is claimed is:

1. A method for operating an optical sensor on a person-guided, motor-assisted coordinate measuring machine, the coordinate measuring machine having a movement controller which can be actuated by a user to control a movement of the optical sensor relative to a measurement object, the method comprising:
   (a) identifying that the optical sensor is in a favorable state of movement relative to the measurement object, wherein the favorable state of movement is a relative position or a range of relative positions in relation to the measurement object in which the optical sensor captures or can capture a surface of the measurement object and in which a first predefined criterion with regard to a suitability and/or quality of the capturing of the measurement object by the optical sensor is satisfied, and
      (i) generating and outputting at least one signal perceptible to the user when the optical sensor is in the favorable state of movement,
         wherein a first signal signals to the user that the optical sensor is in the favorable state of movement, and/or
         wherein when the user actuates the movement controller or attempts to actuate the movement controller such that the optical sensor is to leave the favorable state of movement, a second signal signals to the user that the optical sensor is leaving the favorable state of movement or that the optical sensor is to leave the favorable state of movement in accordance with the actuation of the movement controller by the user or that the optical sensor would have left the favorable state of movement without the presence of the signal in accordance with the actuation of the movement controller by the user,
         and/or
      (ii) inhibiting or blocking by machine a movement of the optical sensor which would cause the optical sensor to leave the favorable state of movement;
   and
   (b) to achieve an orientation of the optical sensor favorable for the measurement of the measurement object by the optical sensor in the favorable state of movement,
      (iii) generating and outputting at least one third signal which is perceptible to the user and which signals to the user to actuate the movement controller such that the optical sensor achieves the favorable orientation, and/or
      (iv) controlling by the coordinate measuring machine a movement of the optical sensor which causes the optical sensor to achieve the favorable orientation,
   wherein the optical sensor includes a system having an autofocus function,
   wherein the optical sensor includes a camera with at least one matrix of sensor elements,
   wherein the system is capable of setting a focus in such a manner that the focus lies on the surface of the measurement object provided that a distance of the optical sensor to the measurement object is within a defined range of distances, and
   wherein the favorable state of movement is a relative position or a range of relative positions of the optical sensor to the measurement object, the relative position or the range of relative positions being in the defined range of distances.

2. The method as claimed in claim 1, wherein the optical sensor is an imaging sensor which has a non-punctiform capture range for capturing at least part of a measurement object from a fixed relative position of the optical sensor and the measurement object and with a fixed orientation of the optical sensor relative to the measurement object.

3. The method as claimed in claim 2, wherein the first predefined criterion in step (a) includes the optical sensor imaging the measurement object sharply at least in part of the capture range.

4. The method as claimed in claim 1, wherein signals are generated and output and signal to the user how the user should actuate the movement controller to achieve the favorable state of movement of the optical sensor.

5. The method as claimed in claim 1, wherein, when the user actuates the movement controller such that the optical sensor is to leave the favorable state of movement, performance of this movement is delayed.

6. The method as claimed in claim 1, further comprising:
   automatically setting a focus of an optical system of the sensor on the surface of the measurement object in a region of the surface of the measurement object captured by the optical sensor, and
   wherein automatically setting the focus of the optical system of the optical sensor on the surface of the measurement object is carried out after the favorable state of movement has been achieved.

7. The method as claimed in claim 1, wherein the favorable state of movement depends on:
   the states of at least one mechanical degree of freedom of the movement of the sensor and the setting of properties of an optical system of the sensor, and/or
   the states of at least two mechanical degrees of freedom of the movement of the sensor.

8. The method as claimed in claim 1, wherein the favorable state of movement is a relative position or a range of relative positions of the optical sensor to the measurement object, the relative position or the range of relative positions being in the center of the defined range of distances, and
   wherein in case of the range of relative positions this range of relative positions is smaller than the defined range of distances.

9. A person-guided, motor-assisted coordinate measuring machine, comprising:
   an optical sensor;
   a movement controller which can be actuated by a user to control a movement of the optical sensor relative to a measurement object;

an identification device configured to determine that the optical sensor is in a favorable state of movement relative to the measurement object, wherein the favorable state of movement is a relative position or a range of relative positions in relation to the measurement object in which the optical sensor captures or can capture a surface of the measurement object and in which a first predefined criterion with regard to a suitability and/or quality of the capturing of the measurement object by the optical sensor is satisfied, and a first signaling device configured to generate and output at least one signal perceptible to the user when the optical sensor is in the favorable state of movement,
wherein a first signal signals to the user that the optical sensor is in the favorable state of movement, and/or
wherein when the user actuates the movement controller or attempts to actuate the movement controller such that the optical sensor is to leave the favorable state of movement, the second signal signals to the user that the optical sensor is leaving the favorable state of movement or that the optical sensor is to leave the favorable state of movement in accordance with the actuation of the movement controller by the user or that the optical sensor would have left the favorable state of movement without the presence of the signal in accordance with the actuation of the movement controller by the user, and/or a blocking device configured to inhibit or block by the coordinate machine a movement of the optical sensor that would cause the optical sensor to leave the favorable state of movement;

and to set an orientation of the optical sensor favorable for the measurement of the measurement object by the optical sensor, a second signaling device, which may be the first signaling device or another signaling device and which is configured to generate and output at least one third signal perceptible to the user and which signals to the user to actuate the movement controller such that the optical sensor achieves a favorable orientation of the optical sensor in the favorable state of movement, and/or a machine controller configured to control by machine a movement of the optical sensor that causes the optical sensor to achieve the favorable orientation, wherein the optical sensor includes a system having an autofocus function, wherein the optical sensor includes a camera with at least one matrix of sensor elements, wherein the system is capable of setting a focus in such a manner that the focus lies on the surface of the measurement object provided that a distance of the optical sensor to the measurement object is within a defined range of distances, and wherein the favorable state of movement is a relative position or a range of relative positions of the optical sensor to the measurement object, the relative position or the range of relative positions being in the defined range of distances.

10. The coordinate measuring machine as claimed in claim 9, wherein the optical sensor is an imaging sensor which has a non-punctiform capture range for capturing at least part of a measurement object from a fixed relative position of the optical sensor and the measurement object and with a fixed orientation of the optical sensor relative to the measurement object.

11. The coordinate measuring machine as claimed in claim 10, wherein the first predefined criterion includes the optical sensor imaging the measurement object sharply at least in part of the capture range.

12. The coordinate measuring machine as claimed in claim 9, wherein the first or the second signaling device or a third signaling device is configured to generate and output at least one fourth signal perceptible to the user and signaling to the user to actuate the movement controller such that the optical sensor achieves the favorable state of movement.

13. The coordinate measuring machine as claimed in claim 9, wherein a setting device of the optical sensor is configured to set a focus of an optical system of the sensor on the surface of the measurement object in a region of the surface of the measurement object captured by the optical sensor when the favorable state of movement exists.

14. The coordinate measuring machine as claimed in claim 9, wherein the favorable state of movement depends on:
the states of at least one mechanical degree of freedom of the movement of the optical sensor and the setting of properties of an optical system of the optical sensor, and/or
the states of at least two mechanical degrees of freedom of the movement of the sensor.

15. The coordinate measuring machine as claimed in claim 9, wherein the favorable state of movement is a relative position or a range of relative positions of the optical sensor to the measurement object, the relative position or the range of relative positions being in the center of the defined range of distances, and
wherein in case of the range of relative positions this range of relative positions is smaller than the defined range of distances.

* * * * *